United States Patent [19]

Littlejohn et al.

[11] 3,909,355

[45] Sept. 30, 1975

[54] TREATMENT OF CELLULAR MATERIAL CONTAINING GLUCOSE ISOMERASE

[75] Inventors: James H. Littlejohn; Robert G. Dworschack, both of Clinton, Iowa

[73] Assignee: Standard Brands Incorporated, New York, N.Y.

[22] Filed: Sept. 6, 1973

[21] Appl. No.: 394,695

[52] U.S. Cl. .................................. 195/31 F; 195/65
[51] Int. Cl.[2] ........................ C12K 1/00; C12K 9/00
[58] Field of Search ....... 195/31 F, 65, 68, DIG. 11, 195/116

[56] References Cited
UNITED STATES PATENTS 3,753,858    8/1973    Takasaki et al.................... 195/65 X Primary Examiner—Lionel M. Shapiro

[57] ABSTRACT

Cellular material containing glucose isomerase which has been heated to fix or stabilize the glucose isomerase therein is treated with a proteolytic enzyme. As a result of this treatment, liquid may be passed readily through a bed or column of the cellular material.

10 Claims, No Drawings

TREATMENT OF CELLULAR MATERIAL CONTAINING GLUCOSE ISOMERASE

This invention relates to a process for treating cellular material containing glucose isomerase. More specifically, this invention relates to a process for treating cellular material containing glucose isomerase with a proteolytic enzyme.

Glucose isomerase is an enzyme which converts glucose to fructose. Various microorganisms are known in the art which produce glucose isomerase. For example, British Pat. No. 1,103,394 and Japanese Pat. No. 7,428 (1966) to Takasaki et al. disclose that microorganisms classifed as belonging to the Streptomyces genus, such as *Streptomyces flavovirens*, *Streptomyces achromogenes*, *Streptomyces echinatus*, and *Streptomyces albus* produce glucose isomerase. There are many other microorganisms which are disclosed in the art as producing glucose isomerase. These include *Aerobacter cloacae*, *Bacillus megaterium*, *Acetobacter melanogenus*, *Acetobacter roseus*, *Acetobacter oxydans*, and *Lactobacillus fermenti*.

There are numerous methods for propagating microorganisms which produce glucose isomerase. The exact conditions of propagation, generally depend upon the particular microorganisms which are to be propagated. Frequently, however, in commercial practice for propagation of the microorganisms, it is desired to proceed by stages. These stages may be few or many, depending upon the nature of the process and the characteristics of the microorganisms. Ordinarily, propagation is started by inoculating spores from a slant of a culture into a presterilized nutrient medium contained in a shaker flask. In the flask, growth of the microorganisms is encouraged by various means, e.g., by shaking for aeration and maintaining suitable temperature. This step or stage is repeated one or more times in flasks or vessels containing the same or larger volumes of nutrient medium. These stages may be conveniently referred to as culture development stages. The microorganisms from the last development stage, with or without accompanying culture medium, are introduced or inoculated into a large scale fermentor to produce commercial quantities of the microorganisms or byproducts therefrom.

Cellular material containing glucose isomerase may be heat treated to fix or stabilize the glucose isomerase therein, for instance, according to the teaching of Japanese Pat. No. 19,030 (1972), while it is in the culture fluid or medium or such treatment may be performed after the cellular material is separated from the culture fluid or medium. After the heat treatment, the filtration characteristics of the cellular material are relatively poor. Substantially the same problem arises when the heat treated cellular material is used in a column or bed to continuously isomerize glucose to fructose as taught, for example by U.S. Pat. No. 3,694,399 to Lloyd et al. The glucose substrate does not pass through the treated cellular material as readily as desired.

Accordingly, it is the principal object of the present invention to provide a method for treating cellular material containing glucose isomerase which has been heated to fix or stabilize the glucose isomerase therein so that a liquid may be passed relatively readily through a bed or column of the cellular material.

This object and other objects of the present invention which will be apparent from the following description may be attained in accordance with the present invention by treating cellular material containing glucose isomerase which has been heated to fix or stabilize the glucose isomerase in or on the cellular material under suitable conditions and with a sufficient amount of a proteolytic enzyme whereby a liquid will more readily pass through a bed or column of said material as compared to the passage of the liquid through a bed or column of cellular material not so treated.

When cellular material containing glucose isomerase which has not been heated to fix or stabilize the glucose isomerase therein is treated with proteolytic enzymes, no improvement is seen in the filtration characteristics of the cellular material. Although we do not wish to be bound to any theory, it is believed that there are certain substances, possibly proteinaceous materials, present in the cellular material which when heated, such as when heat fixation of glucose isomerase is performed, coagulate to form a gel which slows the passage of a liquid through the cellular material. The proteolytic enzymes may dissolve this gel. The improvement in filtration rate by treatment with proteolytic enzymes does not seem common to all cellular material which contains enzymes. For example, when cellular material derived from yeast, *Bacillus subtilis* and *Aspergillus niger* fermentations is treated with proteolytic enzymes, no improvement in the filtration characteristics thereof is observed.

The conditions under which the cellular material containing glucose isomerase is treated with proteolytic enzymes may vary widely, but, of course, must be not such that would deleteriously affect the glucose isomerase. Temperatures up to about 70° C. provide satisfactory results, although it is preferred that the treatment be performed at a temperature in the range of from about 25° to about 45°C. The pH of the aqueous suspension of cellular material during the treatment may also vary widely, for instance, from about 4 to about 10, although a pH in the range of from about 5.5 to about 7.5 is preferred. The period during which the treatment is performed is dependent upon the other conditions of treatment, e.g., pH, temperature, etc., and the amount of proteolytic enzymes used. Generally, under the preferred conditions, the treatment may be effected in from about 10 minutes to about 3 hours.

Exemplary of proteolytic enzymes which may be used in the present process are ficin, bromelain, papain, alkaline protease and mixtures thereof. The preferred proteolytic enzyme is papain.

The preferred cellular material containing glucose isomerase is derived from microorganisms of the Streptomyces genus. Particularly preferred is cellular material derived from Streptomyces sp. ATCC 21175 and Streptomyces sp. ATCC 21176.

In order to describe more clearly the nature of the present invention, specific examples will hereinafter be described. It should be understood, however, that this is done solely by way of example and is intended to neither delineate the scope of the invention nor limit the ambit of the appended claims.

EXAMPLE I

This Example illustrates the use of papain to treat cellular material containing glucose isomerase which has been heated to fix or stabilize the glucose isomerase therein.

Streptomcyes sp. ATCC 21175 was grown under submerged aerobic conditions. The pH of the broth containing the cellular material was adjusted to 7.5, and the broth heated for one-half hour until a temperature of 75°C. was obtained. The broth was maintained at this temperature for 5 minutes to fix the isomerase to the cells. Three per cent by weight filter aid was incorporated into the broth and then the broth was filtered on a rotary drum vacuum filter precoated with diatomaceous earth. The cellular material was washed on the filter and the resulting filter cake was dried in a forced air drier at an air temperature of 49°C. for about 3.5 hours to yield dried cellular material containing fixed or stabilized glucose isomerase. The moisture content of the cellular material was about 15 per cent.

Sufficient quantities of water were added to samples of the cellular material to obtain a total weight in each sample of 100 grams. The samples were treated with papain under the conditions set forth in Table I, while being constantly agitated.

Filtration times shown in Table II for each treated sample of cellular material and its corresponding untreated control were determined on cellular material derived from a separate fermentation.

The samples, after being treated under the conditions set forth in Table I, were filtered through a Whatman No. 3 porosity filter paper, 7 cm. diameter, contained in a Buchner funnel under a vacuum of 22 inches of mercury. The time required for the liquid phase to pass through the filter paper and the glucose isomerase activity of one set of the samples were determined. The results are set forth in Table II below:

TABLE II

| Samples | Filtration Time (min.:sec.) | Glucose Isomerase Activity(IGIU/g)* | |
|---|---|---|---|
| | | Cellular Material | Filtrate |
| 1. Papain Treated | 5:46 | 1141 | 114 |
| 2. Control (No papain treatment) | 10:05 | 1369 | 116 |
| 3. Papain Treated | 2:00 | not determined | not determined |
| 4. Control (No papain treatment) | 15:00 | " | " |
| 5. Papain Treated | 7:00 | " | " |
| 6. Control (No papain treatment) | 22:00 | " | " |

*IGIU is the abbreviation for International Glucose Isomerase Unit and is the amount of enzyme which catalyzes the transformation of D-glucose to D-fructose at the rate of 1μ mole per minute.

From the above Table, it is apparent that treating cellular material containing glucose isomerase with papain results in improved filterability of the cellular material as compared to the control samples which were not so treated. Also, it is seen that papain does not substantially deleteriously affect the glucose isomerase.

EXAMPLE II

This Example illustrates treating cellular material containing glucose isomerase which has been heated to fix or stabilize the glucose isomerase therein with ficin and alkaline protease.

Cellular material containing glucose isomerase was prepared in accordance with the procedure set forth in Example I. Sufficient quantities of water were added to samples of the cellular material to obtain a total weight in each sample of 100 grams. The samples were treated with ficin and alkaline protease under the conditions set forth in Table III while being constantly agitated.

Filtration times shown in Table IV for each treated sample of cellular material and its corresponding untreated control were determined on cellular material derived from a separate fermentation.

Table I

Conditions Under Which Cellular Material Containing Fixed or Stabilized Glucose Isomerase Was Treated With Papain

| Samples | pH | Temperature (°C) | Cellular Material (%) $\frac{\text{weight (gm.)}}{\text{total weight (gm.)}} \times 100$ | Period of Treatment | Papain Units |
|---|---|---|---|---|---|
| 1. Papain Treated | 7.2 | 27 | 5 | 10 (minutes) | 240 |
| 2. Control (no papain treatment) | 7.2 | 27 | 5 | 10 " | None |
| 3. Papain Treated | 7.3 | 63 | 10 | 3 (hours) | 240 |
| 4. Control (no papain treatment) | 7.3 | 63 | 10 | 3 " | None |
| 5. Papain Treated | 7.3 | 63 | 10 | 3 " | 480 |
| 6. Control (no papain treatment) | 7.3 | 63 | 10 | 3 " | None |

*Sigma Chemical Co., Crude Powder Type II (2.4 units/mg.)

Table III

Conditions Under Which Cellular Material Containing Fixed or Stabilized Glucose Isomerase Was Treated with Ficin or Alkaline Protease

| Samples | pH | Temperature (°C) | Cellular Material (%) $\frac{\text{weight (gm.)}}{\text{total weight (gm.)}} \times 100$ | Period of treatment | Ficin Units | Alkaline Protease Units |
| --- | --- | --- | --- | --- | --- | --- |
| 1. Ficin treated | 7.2 | 27 | 5 | 10 | 58 | |
| 2. Control (no enzyme treatment) | 7.2 | " | " | " | None | |
| 3. Alkaline protease treated | 7.2 | " | " | " | | 1000 |
| 4. Control (no enzyme treatment) | 7.2 | " | " | " | | None |

* Sigma Chemical Co., crude grade (0.58 units/mg.)
**1000 units per 0.1 g. (Units of protease determined by a modification of the method of Kunitz M.J., Journal of General Physiology (30) p. 291, 1947.)

The samples, after being treated under the conditions set forth in Table III, were filtered through a Whatman No. 3 porosity filter paper, 7 cm. diameter, contained in a Buchner funnel under a vacuum of 22 inches of mercury. The time required for the liquid phase to pass through the filter paper and the glucose isomerase activity of the separated cellular material and of the filtrates were determined for each sample. The results are set forth in Table IV below:

TABLE IV

| Samples | Filtration Time (min.:sec.) | Glucose Isomerase Activity (IGIU/g)* Cellular Material | Filtrate |
| --- | --- | --- | --- |
| 1. Ficin treated | 3:47 | 1324 | 110 |
| 2. Control (No enzyme treatment) | 4:50 | 1200 | 106 |
| 3. Alkaline protease treated | 4:33 | 1200 | 123 |
| 4. Control (No enzyme treatment) | 6:01 | 1342 | 112 |

*IGIU is the abbreviation for International Glucose Isomerase Unit and is the amount of enzyme which catalyzes the transformation of D-glucose to D-fructose at the rate of 1 μ mole per minute.

From the above Table it is seen that treating cellular material containing glucose isomerase with alkaline protease or ficin results in improved filterability of the cellular material as compared to the control samples which were not so treated. Also, it is seen that the enzyme treatment did not substantially deleteriously affect the isomerase activity of the cellular material.

EXAMPLE III

This Example illustrates the treatment of cellular material derived from various microorganisms with various proteases.

100 ml. samples of *Bacillus subtilis* and *Aspergillus niger* fermentation broths, 8.8 and 12 per cent dry substance respectively, and 100 ml. aqueous samples of yeast containing 1.5 per cent dry substance yeast were treated under the conditions set forth in Table V while being agitated.

The samples, after being treated under the conditions set forth in Table V, were filtered through a Whatman No. 3 porosity filter paper, 7 cm. diameter contained in a Buchner funnel under a vacuum of 22 inches of mercury. The time required for the liquid phase to pass

TABLE V

Conditions Under Which Cellular Material Derived from Various Microorganisms was Treated with Proteases

| Sample | Microorganism From Which Cellular Material Derived | Type of Protease | pH | Temperature (°C) | Period of Treatment (minutes) | Units of Protease Used |
| --- | --- | --- | --- | --- | --- | --- |
| 1. | Yeast | Bromelain* | 7.0 | 45 | 60 | 200 |
| 2. | " | Ficin** | 4.5 | " | " | 58 |
| 3. | " | Papain*** | 7.0 | " | " | 240 |
| 4. | " | Alkaline Protease**** | 7.0 | " | " | 1000 |
| 5. | " | None | 7.0 | " | " | None |
| 6. | *Bacillus subtilis* | Bromelain* | 7.0 | " | " | 200 |
| 7. | " | Ficin** | 4.5 | " | " | 58 |
| 8. | " | Papain*** | 7.0 | " | " | 240 |
| 9. | " | Alkaline Protease**** | 7.0 | " | " | 1000 |
| 10. | " | None | 7.0 | " | " | None |
| 11. | *Aspergillus niger* | Bromelain* | 4.5 | " | " | 200 |
| 12. | " | Ficin** | 7.0 | " | " | 58 |
| 13. | " | Papain*** | 7.0 | " | " | 58 |
| 14. | " | Alkaline Protease**** | 7.0 | " | " | 1000 |
| 15. | " | None | 7.0 | " | " | None |

*Sigma Chemical Co. practical grade (200 units per 0.1 g.)
**Sigma Chemical Co. crude grade (0.58 units per mg.)
***Sigma Chemical Co. crude powder type II (2.4 units per mg.)
****1000 units per 0.1 g. (units of protease determined by a modification of Kunitz, M.J., Journal of General Physiology (30) p. 291, 1947)

through the filter paper was determined and the results set forth below in Table VI.

TABLE VI

| Sample | Microorganism From Which Cellular Material was Derived | Type of Protease | Filtration Time (min.:sec.) |
|---|---|---|---|
| 1. | Yeast | Bromelain | 7:57 |
| 2. | " | Ficin | 14:00 |
| 3. | " | Papain | 40:18 |
| 4. | " | Alkaline Protease | 7:29 |
| 5. | " | None | 5:55 |
| 6. | Bacillus subtilis | Bromelain | >60:00 |
| 7. | " | Ficin | " |
| 8. | " | Papain | " |
| 9. | " | Alkaline Protease | " |
| 10. | " | None | " |
| 11. | Aspergillus niger | Bromelain | 4:21 |
| 12. | " | Ficin | 6:46 |
| 13. | " | Papain | 2:34 |
| 14. | " | Alkaline Protease | 24:18 |
| 15. | " | None | 1:17 |

From the above Table it is apparent that treating cellular material derived from microorganisms such as yeast, *Bacillus subtilis* and *Aspergillus niger* with various protease does not improve the filterability thereof and, in fact, seems to deleteriously affect the same.

The terms and expressions which have been employed are used as terms of description and not of limitation and it is not intended in the use of such terms and expressions to exclude may equivalents of the features shown and described.

What is claimed is:

1. A method of improving the flow rate of a liquid through a bed or column of cellular material derived from microorganisms of the Streptomyces genus containing glucose isomerase which has been heated to fix or stabilize the glucose isomerase in or on the cellular material comprising treating said cellular material under suitable conditions and with a sufficient amount of protolytic enzyme whereby a liquid will more readily pass through a bed or column of said cellular material as compared to the passage of the liquid through a bed or column or cellular material not so treated.

2. A method of improving the flow rate of a liquid through a bed or column of cellular material as defined in claim 1, wherein the liquid contains glucose.

3. A method of improving the flow rate of a liquid through a bed or column of cellular material as defined in claim 2, wherein the proteolytic enzyme is selected from the group consisting of ficin, bromelain, papain, alkaline protease and mixtures thereof.

4. A method of improving the flow rate of a liquid through a bed or column of cellular material as defined in claim 3, wherein an aqueous suspension of the cellular material is treated with a proteolytic enzyme.

5. A method of improving the flow rate of a liquid through a bed or column of cellular material as defined in claim 4, wherein the treatment of the cellular material with a proteolytic enzyme is performed at a temperature of up to about 70°C.

6. A method of improving the flow rate of a liquid through a bed or column of cellular material as defined in claim 5, wherein the treatment of the cellular material with a proteolytic enzyme is performed at a temperature in the range of from about 25° to about 45°C.

7. A method of improving the flow rate of a liquid through a bed or column of cellular material as defined in claim 6, wherein the cellular material is treated at a pH in the range of from about 4 to about 10.

8. A method of improving the flow rate of a liquid through a bed or column of cellular material as defined in claim 7, wherein the cellular material is treated at a pH in the range of from about 5.5 to about 7.5.

9. A method of improving the flow rate of a liquid through a bed or column of cellular material as defined in claim 8, wherein the treatment is performed for a period of from about 10 minutes to about 3 hours.

10. A method of improving the flow rate of a liquid through a bed or column of cellular material as defined in claim 7, wherein the cellular material is derived from Streptomyces sp. ATCC 21175 or Streptomyces sp. ATCC 21176.

* * * * *